United States Patent [19]

Hoyt

[11] 4,023,278

[45] May 17, 1977

[54] TWO AXIS ATTITUDE SENSOR

[76] Inventor: Charles D. Hoyt, 11955 Humboldt Drive, Northglenn, Colo. 80233

[22] Filed: Sept. 5, 1975

[21] Appl. No.: 610,751

[52] U.S. Cl. .............................. 33/377; 73/516 LM
[51] Int. Cl.² ......................................... G01C 9/20
[58] Field of Search ........ 33/366, 377; 73/516 LM; 336/130

[56] References Cited

UNITED STATES PATENTS

| | | | |
|---|---|---|---|
| 3,184,861 | 5/1965 | Conrad | 33/377 |
| 3,516,294 | 6/1970 | Schmieder | 73/516 LM |
| 3,568,325 | 3/1971 | Baltz | 33/377 |
| 3,604,275 | 9/1971 | Fox | 33/377 |
| 3,839,904 | 10/1974 | Stripling et al. | 33/366 X |

Primary Examiner—William D. Martin, Jr.

[57] ABSTRACT

The specification discloses a magnetic liquid core toroidal transformer having four secondary windings spaced 90° apart. When the toroid is deviated from the horizontal plane, the magnetic liquid causes the secondary winding voltages to correspondingly change.

1 Claim, 7 Drawing Figures

TWO AXIS ATTITUDE SENSOR

BACKGROUND OF THE INVENTION

Magnetic properties may be conferred to a wide range of liquids such as hydrocarbons, water, glycerol, silicones and fluorocarbons. These colloidal despersions form a unique class of liquids (called ferrofluids) in which it is possible to induce substantial magnetic forces that result in liquid motion. Conversely, the liquid property of the ferrofluid can be utilized to effect an impedance change in a magnetic bridge or other balanced transformer.

The structure of ferrofluids and the process by which they are produced is adequately described in the literature*. In brief summary, a ferrofluid consists of a dispersion of single domain ferromagnetic particles (e.g., powdered iron-oxide). In order to effect coupling of such particles to the bulk liquid phase, it is necessary to add an ionic or molecular compound whose structure is such that it can both adsorb on the surface of the particle and be solvated by the carrier liquid. This results in the formation of an essentially bound liquid sheath around each particle. A typical compound is oleic acid (a well-known stabilizing agent for dispersions in aliphatic hydrocarbons) which contains a polar carboxylic moiety that is similar to the dispersing medium in chemical composition.

*"Some Applications of Ferrofluid Magnetic Colloids" by Robert Kaiser & Gabor Miskolczy, IEEE Transactions On Magnetics, September 1970.

Since ferrofluids have a high magnetic permeability, they can be used to provide a variable inductance and/or variable coupling transformers, and although the use of conventional fluids in level and attitude sensing devices is well known, there has been no attempt to utilize ferrofluids in a level sensing device to provide a direct electrical readout. What is actually desired therefore, is a simple, inexpensive level sensing device which will generate an electrical signal which is dependent upon the attitude of the device.

Accordingly, a primary object of the present invention is to provide a two axis attitude sensor.

Another object of the present invention is to provide a means for utilizing the high magnetic permeability of a ferrofluid as a level sensing medium.

Other objects and advantages of the present invention will be obvious from the detailed description of a preferred embodiment given herein below.

SUMMARY OF THE INVENTION

The aforementioned objects are realized by the present invention which comprises a donut shaped vessel which is partially filled with a ferromagnetic fluid. The vessel has a balanced center tap primary winding and four equal quadrature windings about its periphery. When the primary winding is energized with an AC signal, an equal voltage will be induced in each of the secondary windings only when the plane of the vessel is horizontal. When the vessel is tilted, an imbalance will be generated in the secondary windings.

DETAILED DESCRIPTION OF A PREFERRED EMBODIMENT

Figure 2:
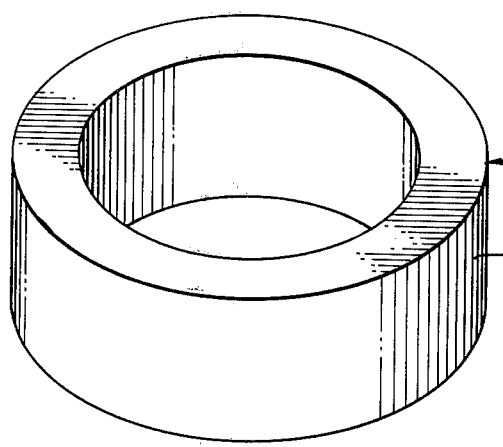
FIG. 2 shows a perspective view of the donut shaped vessel.
Figure 4:
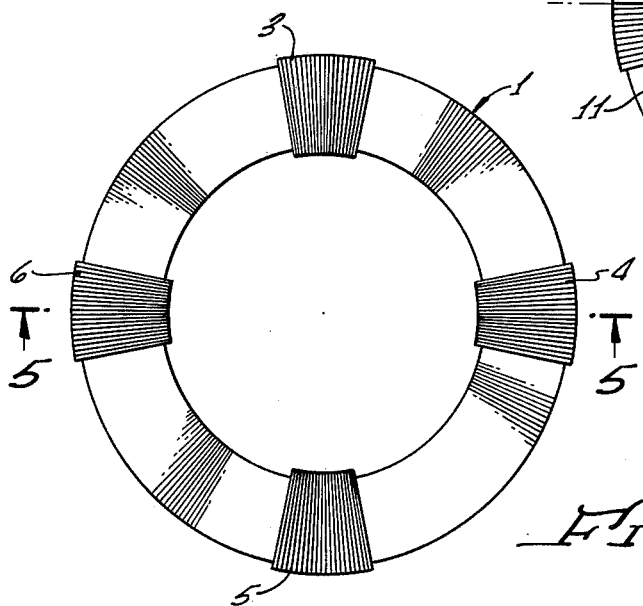
FIG. 4 shows a plan view of a two axis attitude sensor.
Figure 5:
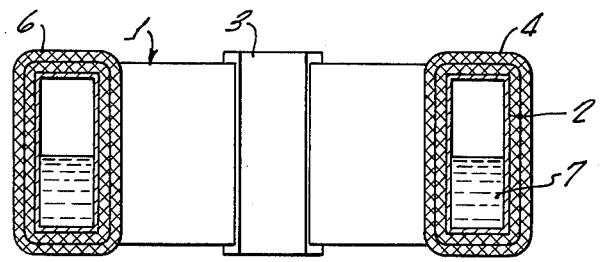
FIG. 5 shows a cross section taken through the plane A—A.

Adverting to the drawings, and particularly FIGS. 2 and 4, a preferred embodiment of the invention comprises a donut shaped vessel 1 having a toroidal primary winding 2, and four equally separated toroidal secondary windings 3, 4, 5 and 6. The vessel 1 itself can be easily fabricated from any non-ferromagnetic material such as plastic which can be made in two identical halves (similar to the containers commonly used to enclose tape wound cores), which can be fitted together and cemented to prevent any fluid leakage. As shown in FIG. 5, the inside of the vessel is filled to approximately 75 percent of its volume with a ferrofluidic compound 7.

Figure 1:
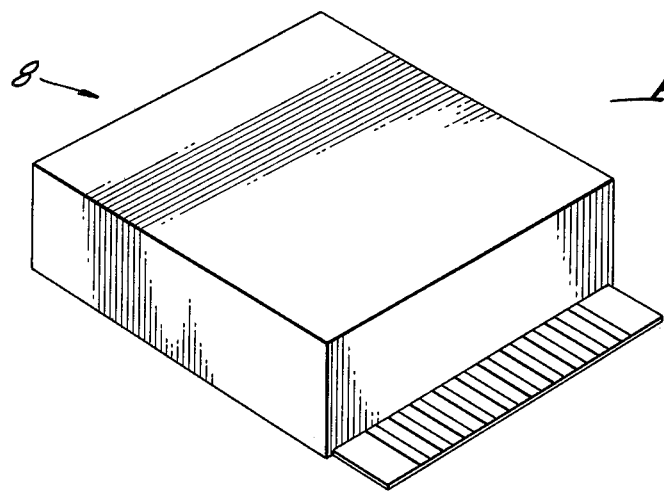
FIG. 1 shows a perspective view of a preferred case and connector plug.
Figure 6:
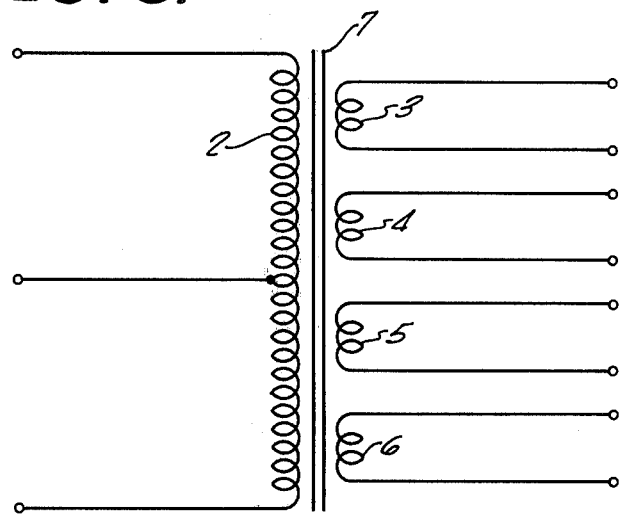
FIG. 6 shows the electrical schematic of the transformer.
Figure 7:
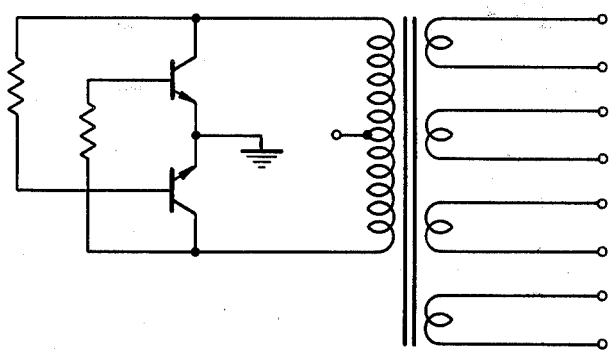
FIG. 7 shows a schematic of the source for generating the A-C excitation of the primary.

Each of the secondary windings 3–6 has the same number of turns, and each is precisely spaced with respect to the other windings. FIG. 6 shows the transformer schematically and FIG. 7 shows a common circuit for generating a square wave primary excitation signal. The secondary windings may be connected in a balanced bridge configuration—or to the input of a differential amplifier—or any equivalent difference detecting circuitry, the details of which are omitted as they form no part of the present invention. The entire assembly including the driving and read-out circuitry, can be incorporated in a single case 8 as shown in FIG. 1.

Figure 3:
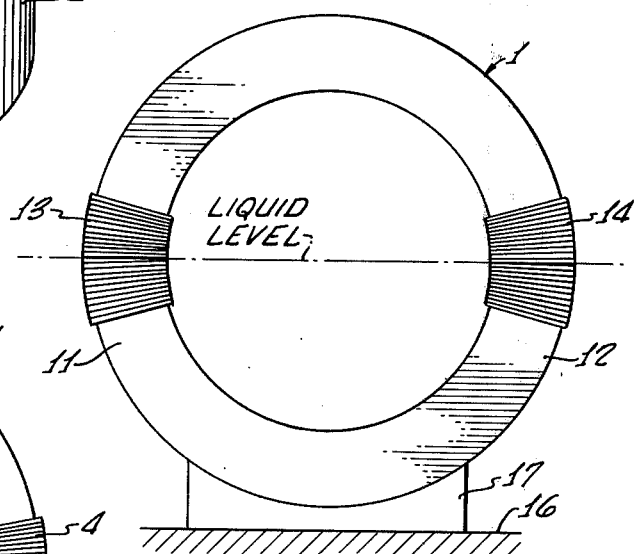
FIG. 3 shows a side view of an embodiment of the device for sensing level deviations about one axis only.

FIG. 3 shows an alternative embodiment of the device which can be used for a single axis attitude sensor. In this configuration, the donut vessel 1 is half filled with ferromagnetic fluid, and the output of each winding is detected via a reactance bridge. When the vessel is deviated from a level position, the height of liquid in the two halves 11 and 12 becomes unequal resulting in a consequent imbalance in the impedance of the two windings 13 and 14. This imbalance may be detected to provide an output which is dependent upon the inclination of the plane 16 of the base 17.

Although the concept of the device has been delineated with reference to specific embodiments, it will be evident that the basic concept of the invention is not limited thereto. For example, the concept of the reactance bridge could be utilized with the four winding horizontal vessel shown in FIG. 4—it being understood that there are a wide variety of circuits and technique for detecting changes in inductive reactance. Thus, although preferred embodiments have been shown and described, it will be understood that the invention is not limited thereto and that numerous changes, modifications and substitutions may be made without departing from the spirit of the invention.

I claim:
1. A measuring apparatus comprising:
   a vessel having a complete toroidal shaped chamber of constant cross section, said chamber being partially filled with a magnetic liquid;
   a primary winding enclosing said toroidal shaped chamber;
   four identical secondary windings enclosing said toroidal shaped chamber, said secondary windings to be equally spaced with respect to each adjacent secondary winding.

* * * * *